United States Patent
Otaka

(10) Patent No.: US 7,405,888 B2
(45) Date of Patent: Jul. 29, 2008

(54) IMAGE TAKING APPARATUS

(75) Inventor: Hiroyuki Otaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/819,225

(22) Filed: Jun. 26, 2007

(65) Prior Publication Data

US 2008/0007842 A1      Jan. 10, 2008

(30) Foreign Application Priority Data

Jul. 5, 2006      (JP)      ............... 2006-185580

(51) Int. Cl.
  *G02B 15/14*      (2006.01)
(52) U.S. Cl. .................. 359/696; 359/697; 359/698
(58) Field of Classification Search ......... 359/694–701, 359/819–823
  See application file for complete search history.

(56) References Cited

U.S. PATENT DOCUMENTS 6,822,810 B2 * 11/2004 Ichino ..................... 359/696
7,019,914 B2 * 3/2006 Omiya et al. ............. 359/695
7,190,533 B2 * 3/2007 Nakamura ................ 359/811

FOREIGN PATENT DOCUMENTS

| JP | 8-292358 A | 11/1996 |
|----|------------|---------|
| JP | 2002-350709 A | 12/2002 |
| JP | 2004-4321 A | 1/2004 |

\* cited by examiner

*Primary Examiner*—Mohammed Hasan
(74) *Attorney, Agent, or Firm*—Sughrue Mion, PLLC

(57) ABSTRACT

An image taking apparatus is provided with a lens driving unit that includes a magnetic shaft in which the S pole and the N pole are alternately aligned in a longitudinal direction of the shaft. The lens driving unit also includes a first lens holding frame that holds a first lens and has a first coil, and a second lens holding frame that holds a second lens and has a second coil. The magnetic shaft is inserted in the first and second coils, so that each of the first and second coils form a linear motor in cooperation with the magnetic shaft.

10 Claims, 6 Drawing Sheets

(a)

(b)

(a)

(b)

IMAGE TAKING APPARATUS

BACKGROUND OF THE INVENTION

1. Field of the Invention

The present invention relates to an image taking apparatus that obtains an image of an object through an image taking optical system and generates image data representing the object.

2. Description of the Related Art

Generally, an image taking optical system provided in an image taking apparatus includes a focus lens and a zoom lens that are required to be moved along an optical axis. Moving such lenses independently requires lens driving units each with a motor and a driving shaft that are provided for the respective lenses, resulting in the enlarged lens barrel in which the lens driving units are incorporated.

In order to miniaturize the lens barrel, there have been proposed a technique in which two driving shafts provided in the respective two lens driving units are integrated into one driving shaft so as to be used in common (see, for example, Japanese Patent Application Laid Open Nos. 8-292358, 2002-350709, and 2004-4321).

However, according to the above-mentioned technique, the driving shaft should be coaxial, and/or a switching mechanism such as a clutch must be provided at a part of the driving shaft, which makes the structure of the lens driving unit complicated.

Incidentally, a large number of small, light and thin-designed digital cameras have recently been released. Such digital cameras can be made thin by employing a refractive optical system. The refractive optical system enables a lens barrel to be housed compactly inside the body of the camera, avoiding such a structure that the lens barrel extends outward, and thus facilitating the effective use of the above technique.

SUMMARY OF THE INVENTION

The present invention has been made in view of the above circumstances and provides an image taking apparatus provided with a lens driving unit that drives a zoom lens and a focus lens independently, using a single driving shaft while avoiding the conventional complicated structure.

An image taking apparatus according to the present invention has a lens driving unit that independently drives a plurality of lenses along an optical axis. The lens driving unit includes: a shaft that extends parallel to the optical axis; a first lens holding frame that holds a first lens of the lenses and has a first coil which, in energized state, causes electromagnetic action between the shaft and the first coil and receives force in a direction along the shaft; a second lens holding frame that holds a second lens of the lenses and has a second coil which, in energized state, causes electromagnetic action between the shaft and the second coil and receives force in the direction along the shaft; a zoom driving section that moves the first lens along the optical axis by controlling power supplied to the first coil; and a focusing section that moves the second lens along the optical axis by controlling power supplied to the second coil.

In the image taking apparatus of the present invention, the single shaft constitutes a driving shaft. The electromagnetic action is caused between the shaft and the first coil, and the shaft and the second coil when the first coil and second coil are energized, so that the first coil and second coil receive force in the direction along the shaft. The first lens is held by the first lens holding frame that is provided with the first coil. The second lens is held by the second lens holding frame provided with the second coil.

Accordingly, when the first coil is energized by the zoom driving section, the first lens is moved along the optical axis apart from the second lens. Alternatively, when the second coil is energized by the focusing section, the second lens is moved along the optical axis apart from the first lens. It should be noted that the first lens and second lens are not limited to a zoom lens and a focus lens respectively, and both may be zoom lenses or focus lenses.

Namely, the present invention can avoid the complicated structure of the conventional lens driving unit and realize the lens driving unit having a simple structure in which the single shaft to which two coils are magnetically connected is disposed parallel to an optical axis. In addition, such a simple structure eliminates the need of a mechanical part that connects the shaft with the lens holding frame. Thus, power supplied from the zoom driving section and the focusing section is efficiently used without loss when driving lenses.

As described above, the present invention can realize the image taking apparatus having the lens driving unit that drives a zoom lens and a focus lens separately using a single driving shaft while avoiding the conventional complicated structure.

Here, preferably the shaft is a magnetic shaft in which an S pole and an N pole are alternately aligned in a longitudinal direction of the shaft, and the first coil and the second coil each form a linear motor in cooperation with the shaft. Alternatively, the shaft may be a scale, and the first coil and the second coil each form a linear pulse motor in cooperation with the shaft. Further, the shaft may be a magnetic shaft in which an S pole and an N pole are aligned perpendicular to the shaft and each extend in a longitudinal direction of the shaft, and the first coil and the second coil each form a voice coil motor in cooperation with the shaft.

Incidentally, when the first coil and the second coil are not energized, it is likely that the first lens holding frame and the second lens holding frame move to come into contact each other.

Therefore, it is preferable to include a movement restriction member that restricts each moving range of the first lens holding frame and the second lens holding frame. Further, it is more preferable to include a spring member that defines each position of the first lens holding frame and the second lens holding frame when the first and second coils are not energized and that extends and contracts following movement of the first lens holding frame and the second lens holding frame when the first and second coils are energized.

Alternatively, instead of the spring member, a magnet may be provided that biases each of the first lens holding frame and the second lens holding frame in a direction perpendicular to the optical axis.

If the image taking apparatus is provided with the magnet, the lens holding frames are biased in the direction perpendicular to the optical axis irrespective of whether the coils are energized or not. Thus, by controlling magnetic force of the magnet, each of the lens holding frames can be always held at a desirable position so as not to contact the shaft. Consequently, it becomes possible to precisely adjust positioning of the focus lens and zoom lens and to perform position control after the positioning of the lenses when the first coil and/or the second coil are energized.

As described above, the present invention can realize the image taking apparatus having the lens driving unit that drives a zoom lens and a focus lens independently using a single driving shaft while avoiding the conventional complicated structure.

DETAILED DESCRIPTION OF THE PREFERRED EMBODIMENTS

Embodiment(s) of the present invention will be described with reference to the accompanying drawings.

Figure 1:
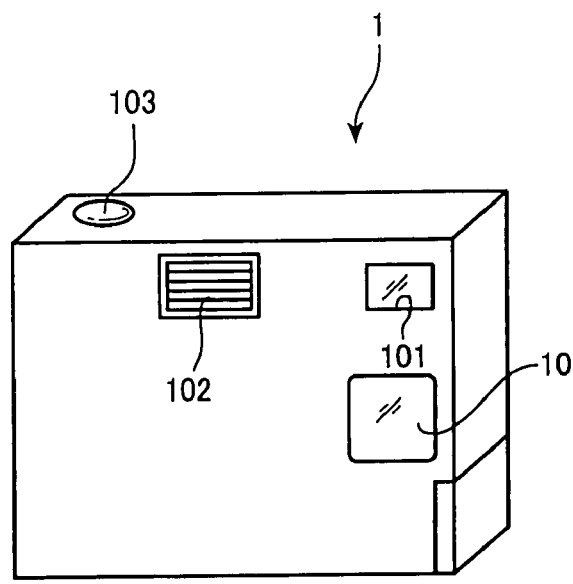
FIG. 1 is a schematic diagram illustrating a configuration of a digital camera according to an embodiment of the present invention.
Figure 2:
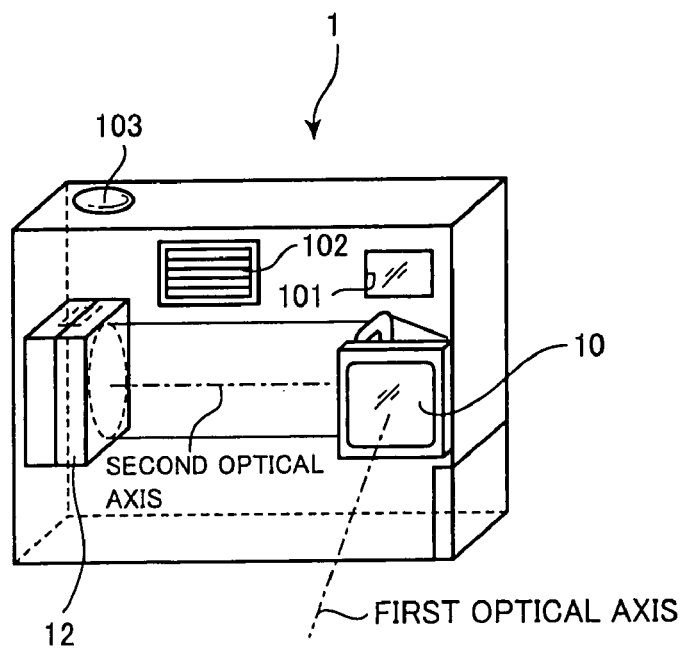
FIG. 2 also shows a configuration of the digital camera according to the embodiment of the present invention.

FIGS. 1 and 2 are schematic diagrams illustrating a configuration of a digital camera 1 according to an embodiment of the present invention. More specifically, FIG. 1 shows an external view of the digital camera 1 and FIG. 2 shows how a refractive optical system is accommodated inside the digital camera 1.

The digital camera 1 shown in FIG. 1 includes: an image taking lens 10 partly shown at the right side of an approximately center of the body of the digital camera 1; a fill flash window 101 disposed above the image taking lens 10 from which a flash is emitted toward an object; a finder 102 disposed beside the fill flash window 101; and a release button 103 disposed on a top surface of the body of the digital camera 1.

As shown in FIG. 2, the refractive optical system represented by the image taking lens 10 is accommodated in the digital camera 1. It should be noted that in the following descriptions the refractive optical system is denoted by the same reference numeral as the image taking lens 10.

The refractive optical system 10 shown in FIG. 2 has such a configuration that an incident light entering along a first optical axis that faces the front toward an object is reflected toward a direction along a second optical axis perpendicular to the first optical axis so as to form an image on an imaging device 12. The refractive optical system 10 also includes a focus lens for focusing and a zoom lens for adjusting the focal length as well as a lens driving unit for independently driving the focus lens and zoom lens provided along the second optical axis. Such a configuration of the refractive optical system 10 enables the elements to be compactly accommodated in the thin body of the digital camera 1.

Figure 3:
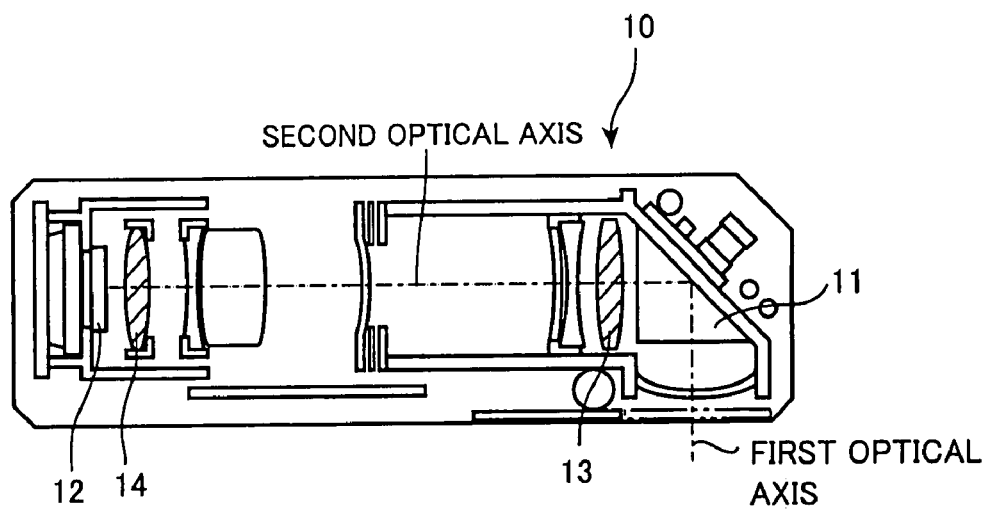
FIG. 3 schematically illustrates a refractive optical system provided in the digital camera shown in FIGS. 1 and 2.
Figure 3:
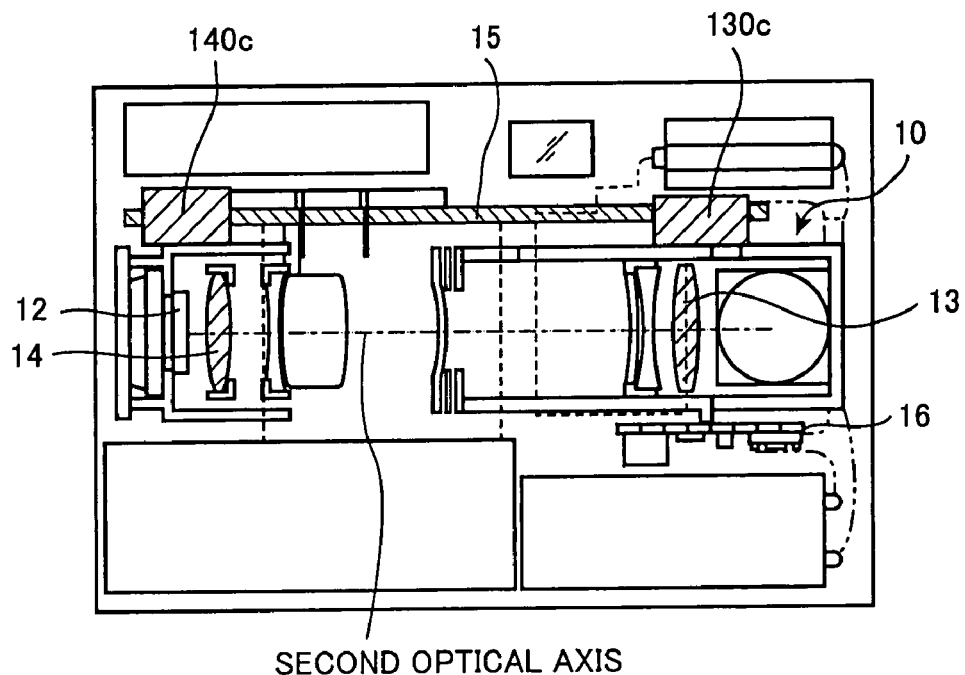

FIG. 3 schematically illustrates the refractive optical system 10. Part (a) of FIG. 3 shows the configuration of the refractive optical system 10 only. Part (b) of FIG. 3 shows how a lens driving unit for independently driving the zoom lens and focus lens provided at the second optical axis is incorporated in the body of the digital camera 1 that employs the refractive optical system 10. Conceptually, the entire refractive optical system 10 shown in Parts (a) and (b) of FIG. 3 functions as a zoom lens. For the sake of simplicity, however, the following descriptions will be made by denoting one of the plural lenses as a zoom lens 13, supposing that the one of the lenses in the refractive optical system 10 is moved to adjust the focal distance.

As shown in Part (a) of FIG. 3, in the refractive optical system 10, an incident light entered along the first optical axis that faces the front is reflected by a reflecting member 11 toward the direction along the second optical axis perpendicular to the first optical axis so as to form an image on the imaging device 12 that is disposed at the end of the second optical axis. The zoom lens 13 and a focus lens 14 are provided along the second optical axis and supported by a shaft 15 that extends parallel to the second optical axis.

Conventionally, for the purpose of miniaturization, two driving shafts have been integrated into one to be commonly used for the focus lens 14 and zoom lens 13, however, a mechanism such as a clutch required to be disposed at the shaft has obstructed further miniaturization.

On the other hand, the present embodiment employs electromagnetic action in order to eliminate the need of a clutch and to simplify the structure of the shaft 15, a connection between the shaft 15 and a first lens holding frame, and a connection between the shaft 15 and a second lens holding frame, so that further miniaturization can be realized.

The lens driving unit provided in the digital camera 1 shown in FIGS. 1 and 2 includes: the shaft 15 that extends parallel to the second optical axis as shown in Part (b) of FIG. 3; a first lens holding frame 130 (see, for example, FIG. 4) holding the zoom lens 13 and provided with a first coil 130c that causes electromagnetic action between the shaft 15 and itself when energized and thereby receives force in the direction along the shaft 15; a second lens holding frame 140 (see, for example, FIG. 4) holding the focus lens 14 and provided with a second coil 140c that causes electromagnetic action between the shaft 15 and itself when energized and thereby receives force in the direction along the shaft 15; a zoom driving section that moves the zoom lens 13 along the second optical axis by controlling power supplied to the first coil 130c; and a focusing section that moves the focus lens 14 along the second optical axis by controlling power supplied to the second coil 140c. The zoom driving section and the focusing section are mounted on a circuit board 16 shown in Part (b) of FIG. 3, and the output terminals of the zoom driving section and the focusing section are respectively connected to the first coil 130c and second coil 140c. The first and second lens holding frames 130, 140 will be described later in detail.

In this embodiment, the first coil 130c and the shaft 15 form a single linear motor and so do the second coil 140c and the shaft 15. The lens driving unit of the embodiment uses such linear motors and thereby obtains a simplified structure.

Hereafter, the lens driving unit will be described in detail.

Figure 4:
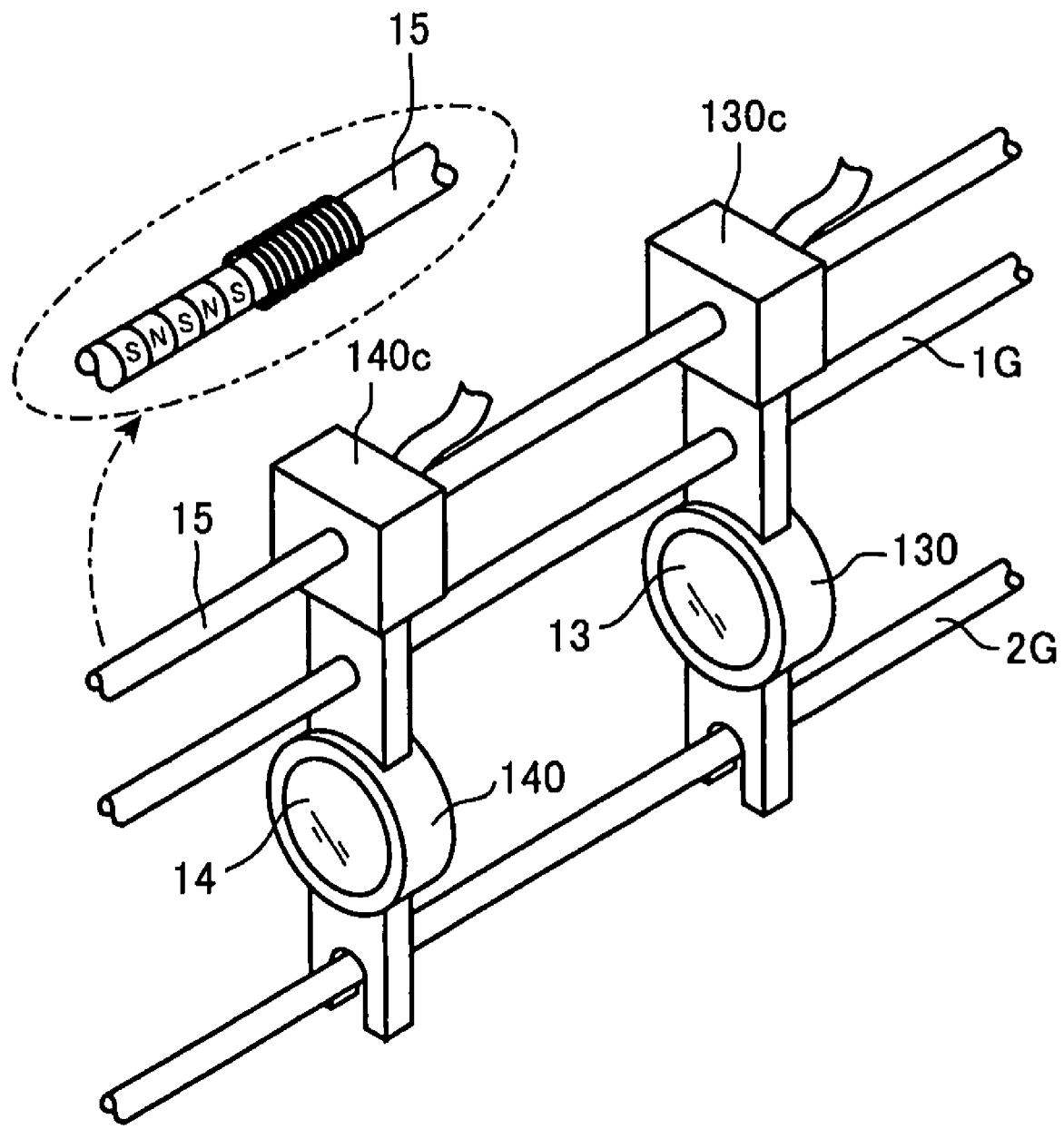
FIG. 4 shows a configuration of a lens driving unit except a zoom section and a focusing section.

FIG. 4 shows the configuration of the lens driving unit except the zoom section and the focusing section.

As shown in FIG. 4, the zoom lens 13 and the focus lens 14 are respectively held by the first lens holding frame 130 and second lens holding frame 140. The first lens holding frame 130 and second lens holding frame 140 are respectively provided with coreless coils 130c and 140c such that the shaft 15 as a driving shaft is inserted in the approximate centers of the coils 130c and 140c.

As shown in FIG. 4, the shaft 15 is a magnetic shaft having such a configuration that the S' pole and the N pole are alternately disposed along the longitudinal direction of the shaft 15. As described before, the first coil 130c and the shaft 15 as well as the second coil 140c and the shaft 15 respectively form a linear motor. FIG. 4 also shows guide shafts 1G, 2G.

The above configuration enables the zoom lens 13 to be moved along the second optical axis, by controlling power supplied to the first coil 130c via the zoom driving section mounted on the circuit board 16 shown in Part (b) of FIG. 3, the zoom lens 13 being held by the first lens holding frame 130 provided with the first coil 130c that generates electromagnetic action between the shaft 15 and the first coil 130c, and thereby receives force in the direction along the second optical axis. Similarly, the focus lens 14 held by the second lens holding frame 140 can be moved along the second optical axis, by controlling power supplied to the second coil 140c provided at the second lens holding frame 140 via the focusing section mounted on the circuit board 16 shown in Part (b) of FIG. 3.

In the linear motors shown in FIG. 4 formed by the shaft 15 and each of the first and second coils 130c, 140c, preferably the first coil 130c and the second coil 140c each have such a configuration that three coils are aligned according to the pitch of the poles, but the number of the coils may be less than or more than three.

Further, use of a linear pulse motor instead of the linear motor enables an open-loop control.

Figure 5:
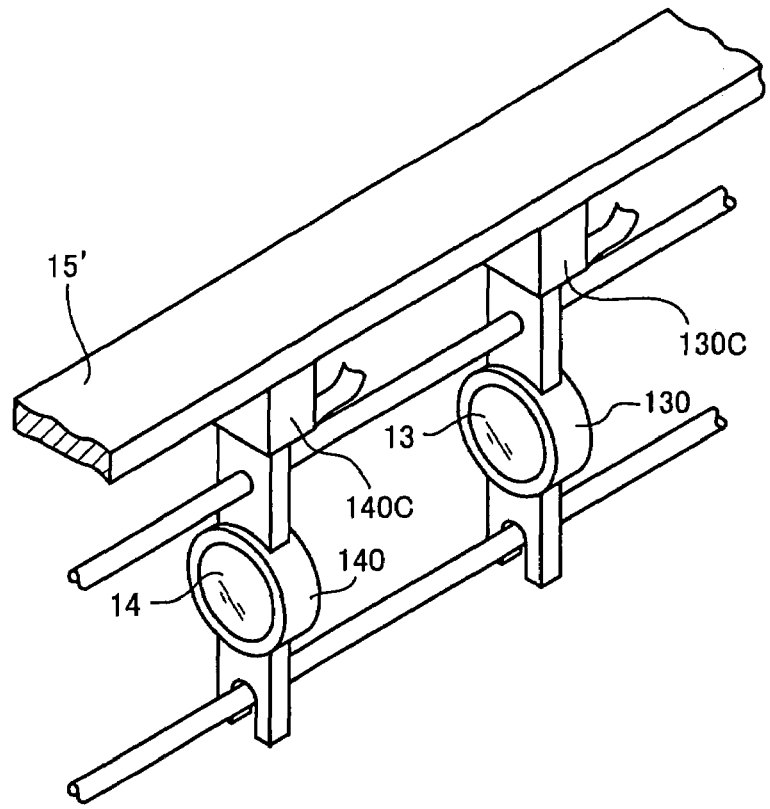
FIG. 5 shows a configuration of a linear pulse motor that is applied to the lens driving unit of the present invention.
Figure 5:
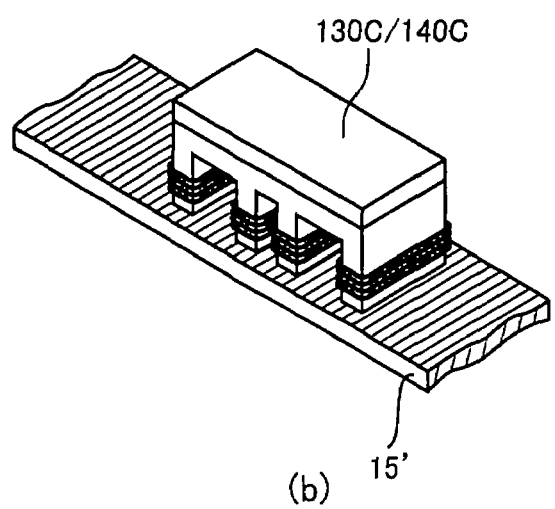

FIG. 5 shows the configuration of the linear pulse motor.

A shaft 15' forming the linear pulse motor is a magnetic scale as shown in part (b) of FIG. 5 in which convexes and concaves are alternately aligned at the predetermined intervals. The linear pulse motor performs a stepping action per one-fourth of one cycle of the irregularities (i.e., half of one convex).

Additionally, instead of the linear motor shown in FIG. 4 or the linear pulse motor shown in FIG. 5, a voice coil motor may be used which is formed by a magnetic shaft, which has the S pole on the top surface thereof and the N pole on the bottom surface thereof, and a coil into which the magnetic shaft is inserted into. Namely, the S pole and the N pole are arranged in the direction perpendicular to the shaft 15M and each extend along the longitudinal direction of the shaft.

Figure 6:
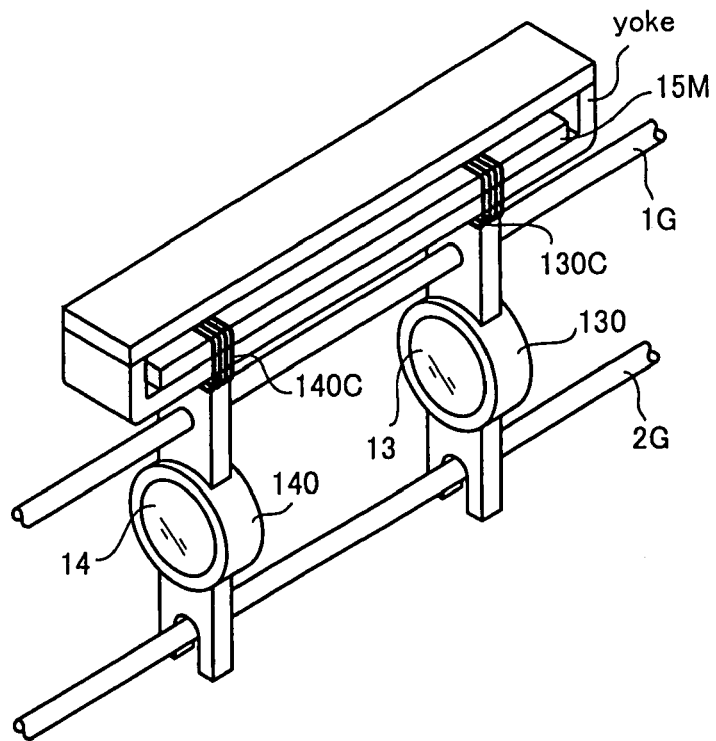
FIG. 6 shows a configuration of a voice coil motor which is applied to the lens driving unit of the present invention.

FIG. 6 shows the configuration of the voice coil motor which is applied to the lens driving unit of the present invention.

As shown in FIG. 6, the shaft 15M has the S pole and N pole arranged perpendicular to the shaft 15M and each extend along the shaft 15M. According to the example shown in FIG. 6, the shaft 15M and a yoke formed of a magnetic material are inserted in the first coil 130c and second coil 140c. The yoke serves as a subsidiary circuit.

Like this, the lens driving unit may have a configuration of the voice coil motor.

As described above, it is possible to realize the image taking apparatus having the lens driving unit that can drive a zoom lens and a focus lens independently using a single driving shaft and without a complicated structure.

Incidentally, according to the configurations shown in FIGS. 1 to 6, if both the first coil 130c and second coil 140c are not energized, the first lens holding frame 130 provided with the first coil 130c and the second lens holding frame 140 provided with the second coil 140c move along the second optical axis. If the first lens holding frame 130 and the second lens holding frame 140 will eventually come into contact, the zoom lens and focus lens may be broken.

For this reason, it is necessary to provide a movement restriction member that restricts each moving range of the first lens holding frame 130 and the second lens holding frame 140.

Figure 7:
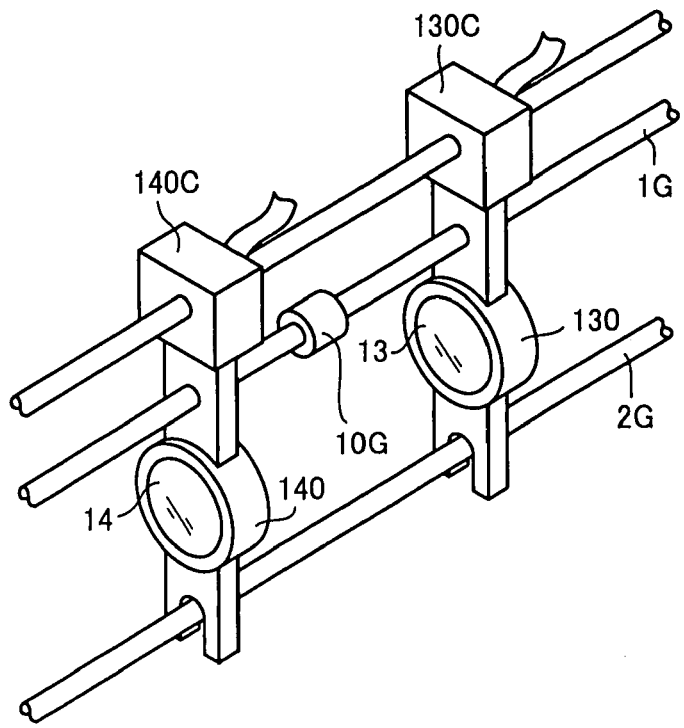
FIG. 7 shows an example in which a movement restriction member for restricting each moving range of a first lens holding frame and a second lens holding frame is added.

FIG. 7 shows an example in which a movement restriction member 10G for restricting each moving range of the first lens holding frame 130 and the second lens holding frame 140 is added.

The presence of the movement restriction member 10G prevents the first lens holding frame 130 and the second lens holding frame 140 from being contact with each other and thus prevents breakage of the zoom lens and focus lens.

Such a movement restriction member 10G surely prevents breakage of the lenses, however, the lens held by the lens holding frame may move following the movement of the coils, making the position of the lens uncertain. As a result, lens position control cannot be precisely performed.

For this reason, preferably spring members may be provided that define the positions of the first lens holding frame 130 and the second lens holding frame 140 when the coils are not energized as well as extend and contract following the movement of the first lens holding frame 130 and the second lens holding frame 140 when the coils 130c, 140c are energized.

Figure 8:
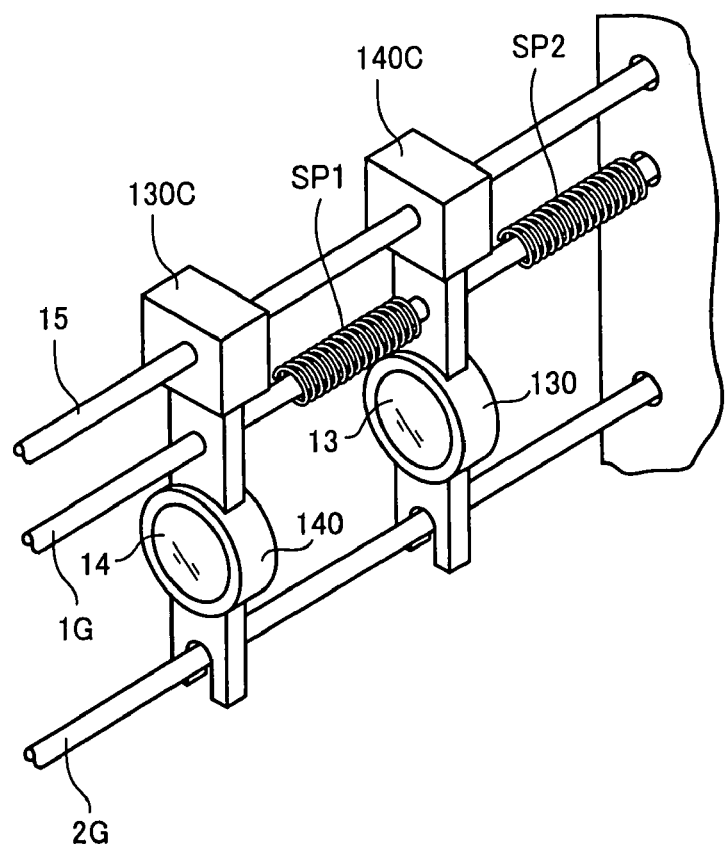
FIG. 8 shows a configuration in which spring members are provided.

FIG. 8 shows a configuration in which spring members SP1, SP2 are provided. The spring members SP1, SP2 define the positions of the first lens holding frame 130 and the second lens holding frame 140 when the coils 130c, 140c are not energized as well as extend and contract following the movement of the first lens holding frame 130 and the second lens holding frame 140 when energized.

According to the configuration shown in FIG. 8, the spring members SP1, SP2 define positions of the lens holding frames 130,140 when the coils are not energized by performing the same function as that of the movement restriction member described referring to FIG. 7. In addition, the spring members SP1, SP2 serve as position restriction members by extending and contracting following the movement of the lens holding frames 130, 140 when the coils 130c, 140c are energized.

Alternatively, instead of the spring members SP1, SP2, in order to hold the first and second holing frames 130, 140, a magnet MAG1 may be provided along the shaft 15, and magnets MAG2 may be provided at each end of the lens holding frames, so that the first lens holding frame 130 and second lens holding frame 140 are biased in the direction perpendicular to the second optical axis due to attraction force between the magnet MAG1 and magnets MAG2.

Figure 9:
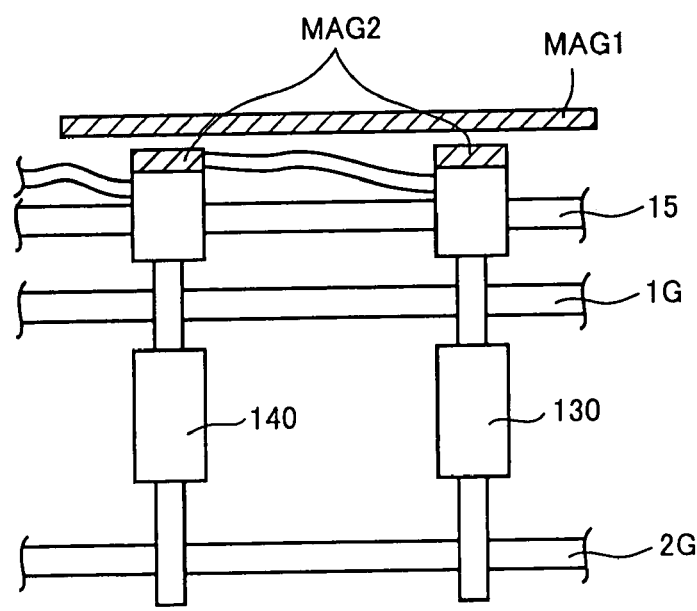
FIG. 9 shows a configuration in which magnets are disposed instead of the spring members.

FIG. 9 shows a configuration in which magnets are disposed instead of the SP1, SP2 in such positions that the first lens holding frame 130 and second lens holding frame 140 can be biased in the direction perpendicular to the second optical axis.

As shown in FIG. 9, the weak magnet MAG1 is disposed parallel to the shaft 15 and the magnets MAG2 are disposed at each end of the first lens holding frame 130 and second lens holding frame 140. Thus, attraction force is generated between the magnet MAG1 and magnets MAG2, which causes each of the first lens holding frame 130 and second lens holding frame 140 to be biased in the direction perpendicular to the second optical axis and thus to be held.

According to the configuration shown in FIG. 9, it is possible to retain the first lens holding frame 130 and second lens holding frame 140 at the respective predetermined positions without supplying power to the coils 130c, 140c, which prevents undesirable movement of the lens holding frames when the coils 130c, 140c are not energized. In addition, as the presence of the magnets MAG1, MAG2 retain the first lens holding frame 130 and second lens holding frame 140 at the respective predetermined positions, high-precision position control becomes possible by, for example, providing an original position sensor that detects the original positions of the lenses and causing the zoom driving section and focusing section to control the positions of the lenses based on the original positions detected by the original position sensor.

As described above, the present invention can realize the image taking apparatus provided with the lens driving unit that is capable of driving the zoom lens and focus lens independently using a single driving shaft while avoiding a complicated structure.

It should be noted that although the image taking apparatus employing the refractive optical system is referred in the embodiment, the present invention may be applied to an image taking apparatus employing any other kind of image taking optical system.

What is claimed is:

1. An image taking apparatus comprising:
a lens driving unit that independently drives a plurality of lenses along an optical axis,
the lens driving unit comprising:
a shaft that extends parallel to the optical axis;
a first lens holding frame that holds a first lens of the lenses and has a first coil which, in energized state, causes electromagnetic action between the shaft and the first coil and receives force in a direction along the shaft;
a second lens holding frame that holds a second lens of the lenses and has a second coil which, in energized state, causes electromagnetic action between the shaft and the second coil and receives force in the direction along the shaft;
a zoom driving section that moves the first lens along the optical axis by controlling power supplied to the first coil; and
a focusing section that moves the second lens along the optical axis by controlling power supplied to the second coil.

2. The image taking apparatus according to claim 1, wherein the shaft is a magnetic shaft in which an S pole and an N pole are alternately aligned in a longitudinal direction of the shaft, and
the first coil and the second coil each form a linear motor in cooperation with the shaft.

3. The image taking apparatus according to claim 2, wherein each of the first coil and the second coil is a three-phase exciting coil.

4. The image taking apparatus according to claim 1, wherein the shaft is a scale, and
the first coil and the second coil each form a linear pulse motor in cooperation with the shaft.

5. The image taking apparatus according to claim 4, wherein the scale has convexes and concaves formed thereon at intervals necessary for placing the first lens and the second lens at respective desirable positions.

6. The image taking apparatus according to claim 1, wherein the shaft is a magnetic shaft in which an S pole and an N pole are aligned perpendicular to the shaft and each extend in a longitudinal direction of the shaft, and
the first coil and the second coil each form a voice coil motor in cooperation with the shaft.

7. The image taking apparatus according to claim 6, wherein the voice coil motor is formed by a magnet and a yoke.

8. The image taking apparatus according to claim 1, further comprising a movement restriction member that restricts each moving range of the first lens holding frame and the second lens holding frame.

9. The image taking apparatus according to claim 1, further comprising a spring member that defines each position of the first lens holding frame and the second lens holding frame when the first and second coils are not energized and that extends and contracts following movement of the first lens holding frame and the second lens holding frame when the first and second coils are energized.

10. The image taking apparatus according to claim 1, further comprising a magnet that biases each of the first lens holding frame and the second lens holding frame in a direction perpendicular to the optical axis.

* * * * *